United States Patent
Eisenbacher et al.

(10) Patent No.: US 12,398,843 B2
(45) Date of Patent: Aug. 26, 2025

(54) LUBRICANT DISPENSER

(71) Applicant: PERMA-TEC GMBH & CO. KG, Euerdorf (DE)

(72) Inventors: Egon Eisenbacher, Karlstadt (DE); Kuno Buehner, Oberbach (DE); Ralf Engelhardt, Schweinfurt (DE); Jochen Lehnert, Niederlauer (DE); Thomas Haupt, Burkardroth (DE)

(73) Assignee: PERMA-TEC GMBH & CO. KG, Euerdorf (DE)

( * ) Notice: Subject to any disclaimer, the term of this patent is extended or adjusted under 35 U.S.C. 154(b) by 205 days.

(21) Appl. No.: 17/428,726

(22) PCT Filed: Feb. 13, 2020

(86) PCT No.: PCT/EP2020/053750
§ 371 (c)(1),
(2) Date: Aug. 5, 2021

(87) PCT Pub. No.: WO2020/187500
PCT Pub. Date: Sep. 24, 2020

(65) Prior Publication Data
US 2022/0112981 A1    Apr. 14, 2022

(30) Foreign Application Priority Data

Mar. 15, 2019   (DE) .......................... 102019106692.3

(51) Int. Cl.
*F16N 13/22*   (2006.01)
*F16N 11/08*   (2006.01)
*F16N 19/00*   (2006.01)

(52) U.S. Cl.
CPC .............. *F16N 13/22* (2013.01); *F16N 11/08* (2013.01); *F16N 19/003* (2013.01); *F16N 2230/18* (2013.01); *F16N 2260/04* (2013.01)

(58) Field of Classification Search
CPC ........ F16N 11/10; F16N 13/22; F16N 19/003; F16N 2230/18; F16N 2260/04
See application file for complete search history.

(56) References Cited

U.S. PATENT DOCUMENTS 5,303,585 A * 4/1994 Lichte ................. G01F 23/2962
                                                        367/908
5,586,085 A * 12/1996 Lichte ..................... G01F 25/20
                                                        367/908
(Continued)

FOREIGN PATENT DOCUMENTS

DE         10347176 A    6/2004
DE    202007012372 A    2/2009
(Continued)

*Primary Examiner* — Minh Truong
(74) *Attorney, Agent, or Firm* — Andrew Wilford

(57) ABSTRACT

The invention relates to a lubricant dispenser comprising a storage container (1) filled with lubricant and a pump unit (2) which can be connected to or is releasably connected to the storage container and by means of which the lubricant can be pumped from the storage container (1) to an outlet (5) of the pump unit (2) and is equipped with an electronic controller (35). The lubricant dispenser is characterized in that the storage container (1) is equipped with an electronic coding means (36) which can be connected to the electronic controller (35) of the pump unit (2) and can be read by same so as to transmit information in the assembled state in order to identify the storage container (1).

13 Claims, 4 Drawing Sheets

(56) References Cited

U.S. PATENT DOCUMENTS

| | | | |
|---|---|---|---|
| 6,216,822 B1 | 4/2001 | May | |
| 6,354,816 B1 | 3/2002 | Yang | |
| 7,228,941 B2 | 12/2007 | Wiegand | |
| 8,620,479 B2 | 12/2013 | Botha | |
| 10,265,721 B2 | 4/2019 | Beckett | |
| 10,690,026 B2 * | 6/2020 | Goodier | F01M 11/04 |
| 10,704,451 B2 * | 7/2020 | Lake | F01M 11/0458 |
| 11,199,293 B2 * | 12/2021 | Gibson | F16N 29/02 |
| 2004/0250623 A1 * | 12/2004 | Walker | F16C 33/102 |
| | | | 73/593 |
| 2009/0277657 A1 * | 11/2009 | Berger | F16N 29/02 |
| | | | 173/171 |
| 2010/0181327 A1 * | 7/2010 | Kanda | B65D 1/0292 |
| | | | 220/601 |
| 2011/0253481 A1 | 10/2011 | Lin | |
| 2015/0292372 A1 * | 10/2015 | Barnes | F01M 1/18 |
| | | | 701/102 |
| 2017/0089235 A1 * | 3/2017 | Dawson | F16N 37/00 |
| 2017/0089236 A1 * | 3/2017 | Andersen | F01M 11/04 |
| 2017/0107873 A1 * | 4/2017 | Ali | F01M 1/02 |
| 2017/0122151 A1 * | 5/2017 | Brett | F01P 11/06 |
| 2018/0258806 A1 * | 9/2018 | Butterworth | F01M 11/02 |
| 2018/0266873 A1 * | 9/2018 | Goodier | F01M 11/12 |
| 2019/0001954 A1 * | 1/2019 | Ali | F28D 20/02 |
| 2022/0268185 A1 * | 8/2022 | Dewhurst | F01M 11/0408 |

FOREIGN PATENT DOCUMENTS

| | | | | |
|---|---|---|---|---|
| FI | 126493 B | * | 1/2017 | F16N 7/38 |
| WO | 2009143975 A | | 12/2009 | |
| WO | 2014076319 A | | 4/2014 | |

\* cited by examiner

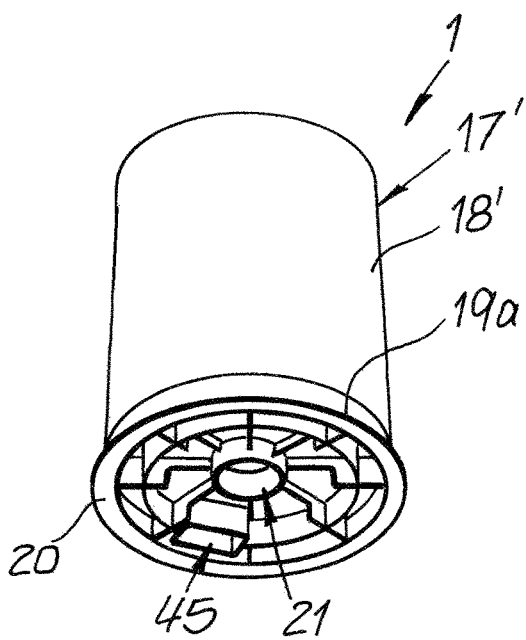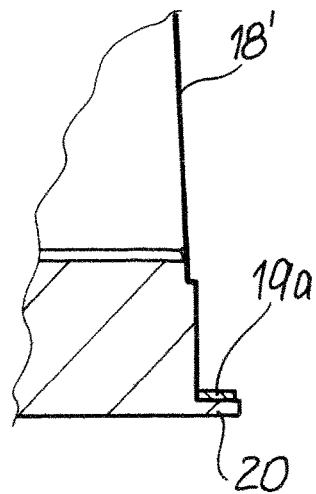
Fig.3  Fig.3A
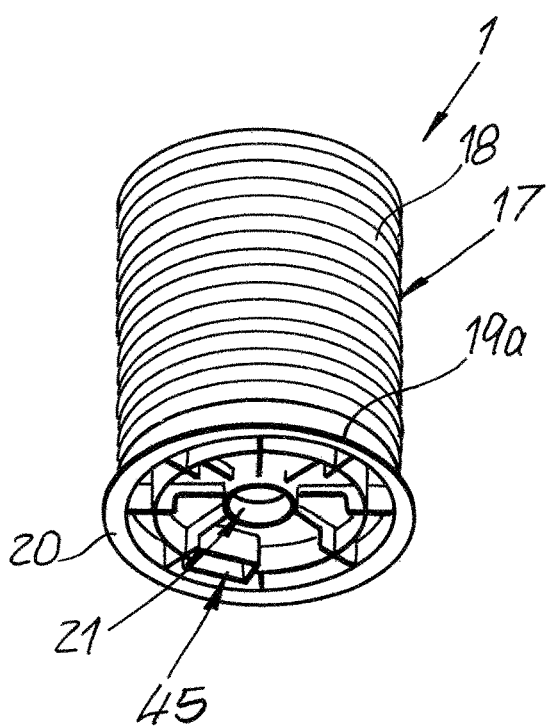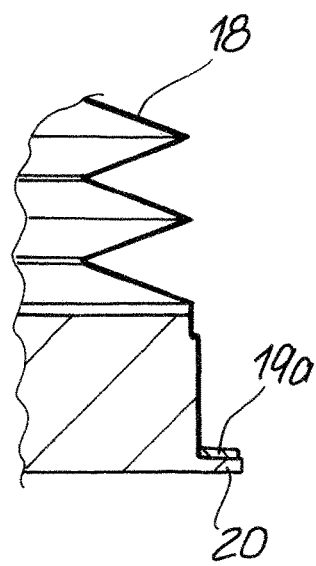
Fig.4  Fig.4A

LUBRICANT DISPENSER

CROSS REFERENCE TO RELATED APPLICATIONS

This application is the US-national stage of PCT application PCT/EP2020/053750 filed and claiming the priority of German patent application 102019106692.3 itself filed 15 Mar. 2019.

FIELD OF THE INVENTION

The invention relates to a lubricant dispenser comprising a reservoir that is filled with lubricant and a pump (also referred to as a drive unit or drive head) that is equipped with an electronic controller and detachably connected to the reservoir as a separate, replaceable structural unit, for conveying lubricant from the reservoir to an outlet of the pump.

BACKGROUND OF THE INVENTION

Such lubricant dispensers are used, for example, for the automated lubrication of machine parts or plant parts, such as, for example, rolling and sliding bearings, linear guides, chains or the like. The lubricant dispensers are connected, for example, to a lubricating point (for example a bearing) and can emit lubricants as a function of the running time of a machine or at predetermined intervals. Fats or oils, for example, are used as lubricant. The reservoir is also referred to as a cartridge, and such a cartridge can be detachably and interchangeably connected to the pump to form a structural unit, for example by a screw connection, plug-in connection, latch, bayonet joint or the like. For this purpose, the pump is equipped with a conveying device controlled by the controller, for example a pump or the like, and the controller can select various parameters for operation, for example dispensing time, dispensing intervals or the like. As a rule, a plunger or piston can be reciprocated by a drive in the pump, so it is cyclically raised and lowered in order to convey the lubricant from the reservoir to the outlet with the aid of the drive controlled by the controller, and thus lubricant is sucked out of the reservoir and pressed out of the outlet opening. In principle, such a lubricant dispenser can be designed as a single-point lubricant dispenser, where the lubricant dispenser is connected to the outlet directly or with the interposition of a hose to the lubrication point. Alternatively, however, the lubricant dispenser is used as a multi-point lubricant dispenser for a plurality of outlet openings or, preferably, a separate distribution device is connected to the outlet opening, via which a plurality of lubrication points are supplied from a single lubricant dispenser at different locations via hoses. Such individual and multi-point lubrication systems are known from practice in a wide variety of embodiments.

A lubricant dispenser of the type described above is known, for example, from DE 102 34 881 [U.S. Pat. No. 7,228,941]. The reservoir is connected to the pump designated as a drive head, in which a rotary movement of a control surface is converted into a lifting movement of the piston via a cam arrangement with control surfaces and lubricant is thereby conveyed from the reservoir to the outlet at the piston end. A piston connected to a threaded spindle is also inside the reservoir and displaces the lubricant out of the reservoir and to the lubricant passage of the drive shaft.

Another embodiment of a lubricant dispenser is known from DE 298 18 084 [U.S. Pat. No. 6,216,822]. The controller of the lubricant dispenser has a selector switch connected to a microcontroller via an input interface for setting the dispensing time. Furthermore, the controller has a selector switch connected to the microcontroller via an input interface, for setting the cartridge size. Moreover, the controller can have automatic cartridge-size detector.

WO 2010/026559 [U.S. Pat. No. 8,620,479] describes the possibility of wireless communication of a control computer with a plurality of lubricant dispensers.

US 2011/0253481 discloses a lubricant dispenser with the possibility of monitoring and with an alarm system, where a plurality of lubricant dispensers can also be monitored via a computer.

Lubricant dispensers of the type described above have proved to be outstandingly suitable in practice, but they are further capable of development. This relates in particular to the operational reliability and/or the adjustment and evaluation possibilities.

Furthermore, US 2015/0266050 [U.S. Pat. No. 10,265,721] describes an actuating device for a grease cartridge, in which an automated setting of the metering quantity be possible. To this end, the cartridge can be identified by a bar code, a QR code or RFID.

DE 103 47 176 describes a grease handling system in which a grease cartridge is connected to a filling station. The grease cartridge has a flange on which an exchangeable shield is attached, on which the material designation for the grease and a code number are entered. A steel angle, which can be set into a specific position in accordance with the code number of the material, is screwed onto the rear side of the flange. Interrogation sensors are provided at the filling station, and one of them determines the correct allocation of the fat reservoir to the fat metering device or to the container pump.

Finally, it is possible from the field of motor-vehicle technology to identify liquid containers during connection of the liquid container to the liquid circuit of the vehicle drive (see WO 2014/076319).

OBJECT OF THE INVENTION

The aim of the invention is to provide a lubricant dispenser of the type described above that is characterized by simple construction and of increased operational reliability and/or functionality.

SUMMARY OF THE INVENTION

In order to attain this object, the invention relates to a generic lubricant dispenser of the above-described type where the reservoir is equipped with an electronic data/code carrier that can be read by the electronic controller of the pump in order to transmit information in order to identify the reservoir in the mounted state.

The invention is based on the discovery that reservoirs, which are also referred to as cartridges, are generally designed in models each adapted to a particular pump and are made so that the reservoir on the one hand and the pump on the other hand form a modular unit in which they are structurally and functionally fitted to one another. As a rule, the reservoir is an exchangeable accessory. The invention relates to a replacement part, which represents a consumable material in a disposable design, while the pump can be reused as a drive head. Consequently, during the service life of a pump of such a lubricant dispenser, the reservoir is repeatedly replaced as a consumable material. In order to ensure operational reliability and satisfactory functionality, it is important that the cartridge or the reservoir be filled as air-free as possible and with a suitable lubricant. To this end, care must be taken that the cartridge (reservoir) to be exchanged is actually intended for the respective pump. According to the invention, this is achieved by the electronic data carrier that is on the reservoir and that during insertion of the cartridge onto the pump, automatically contacts the pump and can thus be read by the controller of the pump. In this way, the controller of the pump can easily and unambiguously identify the reservoir. This makes it possible to operate the pump only if a correctly identified cartridge provided for this pump is installed or to interrupt pump operation (for example the drive) if the identification is not correct. For this purpose, the electronic data carrier can contain at least one piece of information, for example an identifier that in turn can be read by the pump and also stored there as a permissible identifier for a comparison. In addition, it is possible to provide further functionality with such electronic data carrier. Thus, the data carrier, which for example is or contains a printed circuit board, can have a memory in which can be stored information about the reservoir, for example, the container type and/or the container size and/or the lubricant or lubricant type and/or the removed lubricant quantity and/or the fill level or the residual volume. Temporary information can also be stored, for example the point in time of installation and thus the point in time of the application of the cartridge and/or the operating time. On the one hand, there is on the possibility that the data carrier can only be read-only, that is to say information from the data carrier can only be read out by the controller. Optionally, there is on the possibility of bidirectional communication or bidirectional transmission of information, in that, for example, the controller can write into a memory of the data carrier.

The pump can have, in a basically known manner, a housing that holds at least one drive for conveying the lubricant and the controller connected to the drive and that has an end wall facing the reservoir and formed with an intake port. The reservoir in turn has a floor juxtaposed with the pump and formed with an outlet port. Such a reservoir is connected to the pump in a basically known manner and, when the reservoir is being installed on the pump, the outlet port is connected to the intake port. According to the invention, it is now provided that connection of the pump to a reservoir (or vice versa), is not only the outlet port connected to the intake opening, but at the same time the data carrier is also connected or contacted with the controller (information technology). The functional connection of the data carrier to the controller for the purpose of reading it is consequently carried out automatically during mounting of the reservoir on the pump.

Particularly preferably, the communication connection between the data carrier and the controller takes place via a mechanical connection, i.e. communication between the data carrier and the controller takes place in a hard-wired manner, not wirelessly. This leads to a very simple construction and to a high degree of functional reliability.

In terms of construction, this can be realized, for example, in that a first (mechanical) contact array is provided on the reservoir floor wall and a second (mechanical) contact array is also provided, and they are mechanically connected to one another when correcting the pump to the reservoir and at the same time are electrically contacted at the same time, the first contact array being connected to the data carrier (electrically) or forming this data carrier and the second contact array being (electrically) connected to the controller.

For this purpose, the first contact array can be inserted, for example (mechanically) into the second contact array and can thus be electrically contacted, or alternately the second contact array can be (mechanically) inserted into the first contact array and can thus be electrically contacted therewith. The first contact array and the second contact array can consequently form a mechanical and electrical plug connection. The data carrier can be integrated in the first contact array or can be formed by this first contact array. Thus, for example, the first contact array can be designed as an electronic circuit board that has or forms the data carrier. Accordingly, the second contact array can be designed as a printed circuit board plug into which the printed circuit board can be inserted as a first contact array such that the printed circuit board connector is connected to the controller. The circuit board connector consequently forms a socket for the circuit board into which the circuit board can be plugged. In this way, overall, a very simple design is realized because only one circuit board, which at the same time forms the data carrier (and has, for example, a memory), and furthermore at the same time the mechanical plug-in connection, in which it can be inserted into the circuit board plug (for example circuit board edge plug), has to be provided on the cartridge.

In order to fasten a simply constructed data carrier, for example the board, simply to the container, the container, for example the floor, can be provided on the outside with a mechanical holder in which the data carrier, for example the printed circuit board, is held mechanically. Such a holder can be arranged, for example, in one piece on the floor, for example integrally formed thereon or formed therefrom.

As an alternative to the described embodiments, in which the communication connection between data carrier and controller takes place via a wired or wired connection, wireless communication connections between data carrier and controller can also be implemented. For this purpose, for example, connections or identifications are possible with the aid of electromagnetic waves, for example by RFID technology. For example, the reservoir can be equipped with a data carrier or identification means in the form of an RFID transponder. The pump, in particular the electronic controller thereof, can be equipped or connected to a corresponding reading device for such an RFID transponder. With such a wireless technique, the idea according to the invention of identifying the reservoir in the mounted state can also be realized. In this case, the basically known properties of RFID technology can be employed, in particular the frequency ranges conventionally used. The RFID transponder on the reservoir preferably has at least one microchip and one antenna. The transponder can be designed as an active transponder with an energy source or as a passive transponder without its own power source. The RFID transponder is preferably not only readable, but also writable, so that relevant information can be written in it, in particular for identifying the cartridge.

In principle, the invention relates to a lubricant dispenser in a known construction with a rigid, cup-like reservoir in which a piston (for example, connected to a threaded spindle) is arranged, via which the lubricant is displaced from the reservoir (cf. For example, DE 102 34 881).

Alternatively, however, the reservoir is a container that collapses while emptying (self-contained), or the reservoir has such a collapsing inner container. This means that, when emptying, the container collapses automatically as a result of the negative pressure generated within the container and the (upper) container wall is moved toward the pump. The reservoir thus has a significantly reduced waste size. This is because the waste product is a container reduced from an original container volume, as it collapses and thus has a significantly reduced waste volume, so that disposal is simplified. In addition to the collapsing reservoir, a rigid, non-collapsible protective cap is particularly preferably provided, so that the filled reservoir is held inside this protective cap in the mounted state. Optionally, the reservoir can be fixed to the pump or the housing with the aid of this protective cap. The protective cap itself can be reused, while the reservoir can be replaced as a collapsing inner container and consequently forms a disposable product with a minimum residual volume.

In a first embodiment, the reservoir (or its inner container) is a bellows with a concertina-like casing. Such reservoirs as bellows are fundamentally known in connection with lubricant dispensers. They can preferably be provided with a self-priming pump without additional spring loading. Such a bellows can have folds running parallel to one another or alternatively also spiral folds.

In a second embodiment, the reservoir (or its inner container) is cup-shaped as a collapsing cup with a thin-walled, flexible cylindrical cup casing, similar to that known, for example, in conventional disposable drinking cups. While emptying, the container or the upper wall of the inverted cup is sucked toward the pump and, in the process, the thin-walled cup casing folds together, so that, as in the case of a bellows, a waste product with minimal residual volume remains. In contrast to a solution with bellows, the solution with a collapsing cup also has the advantage that optimum residual emptying can take place, since no residual amounts can remain within the folds of a bellows.

In both embodiments, there is on the possibility that the (foldable, collapsible) cup casing or container casing is connected to a rigid base component that has or forms the floor. The collapsing container is consequently placed on the pump with this rigid floor and in the process the data carrier is contacted with the controller in the manner described. The already mentioned holder for the data carrier can be formed, for example, in one piece with this rigid base component.

When using a collapsing reservoir, it has an upper end wall or ceiling that, while the collapsing container empties, is lowered against the floor and thus also toward the pump. In such an embodiment, of particular significance to the invention, a sensor is provided in or on the pump for detecting an approach of the container top wall to the floor in order to detect the empty state of the container. For this purpose, it is possible for the container floor to be for example provided on its lower face with a detectable label that can be detected by the sensor as soon as the label and thus also the container cover has approached the sensor and thus also the pump within a certain distance. The detectable label may be, for example, a label of a metallic and/or ferromagnetic material. The sensor is accordingly adapted in that it detects, for example, the approach of a metallic and/or a magnetic material. This may be, for example, a Hall-effect sensor.

The invention relates not only to the described lubricant dispenser, but also to a reservoir having the electronic data carrier described on the one hand and also to a pump, that can read this electronic data carrier. The reservoir according to the invention on the one hand and the pump according to the invention on the other hand are consequently also independently provided with protection.

The invention further relates to a method of operating a lubricant dispenser of the type described. In this method, the method steps and functions described above are referred to.

BRIEF DESCRIPTION OF THE DRAWING

In the following, the invention is described in more detail with reference to drawings showing a single embodiment. Therein:

FIG. 3 shows a reservoir of the lubricant dispenser according to FIG. 1;

FIG. 3A is a large-scale detail from FIG. 3

FIG. 4 shows a variant on the reservoir of FIG. 1;

FIG. 4A is a large-scale detail from FIG. 4; and

SPECIFIC DESCRIPTION OF THE INVENTION

Figure 1:
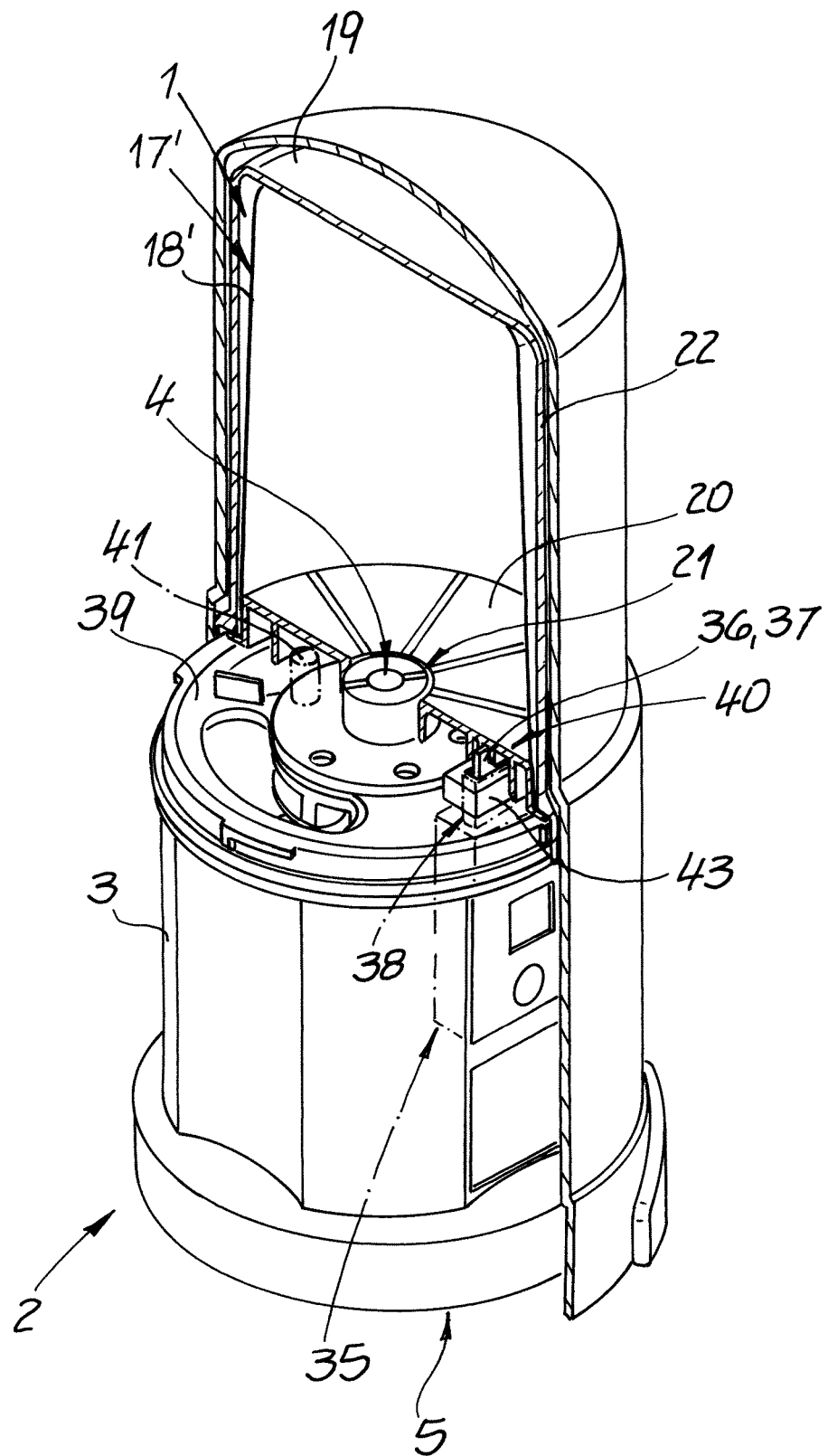
FIG. 1 is a partly sectional perspective view of a lubricant dispenser.

The drawing shows a lubricant dispenser and thus an apparatus for distributing a lubricant, the lubricant dispenser being basically comprised of a reservoir 1 and a pump 2 that is also known as a drive or drive head and that is basically a pump. The lubricant-filled reservoir 1 is releasably mounted on the pump 2. The reservoir and pump 2 can be disconnected and switched out so as to be (modularly) exchangeable usable to form an assembly. The pump 2 conveys the lubricant out of the reservoir 1 to an outlet 5 of the pump 2. Such a lubricant dispenser is connected to a location needing lubrication (e.g. near a bearing of a machine or the like). The pump 2 can be provided with a pump module that for example has a reciprocating piston driven by an unillustrated drive in the pump so as to draw lubricant out of the reservoir 1 and convey it to the outlet 5. Details of the construction and operation of the pump 2 or the pump module are not shown in the drawing. Various different models are known in the state of the art.

Possible other embodiments of the reservoir 1 connected to the pump 2 shown in FIG. 1 are shown in FIGS. 3 and 4. Such a reservoir 1 is cup-shaped and has a floor 20 turned toward the pump 2 and formed with an outlet opening 21. The reservoir 1 is placed with this floor 20 onto the pump, namely on its upper end wall 39 that has an intake port 4 that can fit with the outlet port 21 of the reservoir 1 to connect it to the intake port 4 of the pump 2. It can be seen in FIG. 1 that the reservoir 1 is fixed to the pump 2 by a protective cap 22, for example with a screw or bayonet connection, to be more precise, usually with the interposition of seals. This embodiment with the protective cap 22 is particularly preferably used in a reservoir 1 designed to be collapsible. This will be discussed in connection with FIGS. 3 and 4. However, the invention also includes embodiments in which the reservoir 1 itself has a self-supporting and consequently rigid casing closed with an additional protective cap. In this case, installation entails placing the reservoir 1 on the pump 2 or connecting them with separate mounting tools.

The pump 2 has a housing 3 holding at least the pump module mentioned above for conveying the lubricant and parts connected thereto like a controller 35, here illustrated schematically. The controller 35 serves to control the pump, for example via its drive, so that, for example, certain parameters of the lubricant dispenser, such as dispensing intervals, dispensing periods or the like can be set via the controller. According to the invention, the reservoir 1 is equipped with an electronic data carrier 36 that, in the assembled state, can be connected to the electronic controller 35 of the pump 2 for transmitting information and can be read by the latter in order to identify the reservoir 1. Here, connecting the pump 2 to the reservoir 1 on the one hand connects the outlet port 21 in the floor 20 to the intake port 4 in the end wall 39 and at the same time on the other hand (electrically) connects or contacts the data carrier 36 to the controller 35. For example, the data carrier 36 may store or hold identification data of the cartridge. While reading the data carrier 36, the controller 35 of the pump 2 can determine, for example, whether the identifying data stored in the data carrier 36 matches the identifier data stored as permissible in the control unit, and whether it is consequently a cartridge suitable or permitted for the pump. Optionally, there is the possibility that the memory of the data carrier 36 holds further information about the reservoir, for example, the container type and/or the container size and/or the lubricant and/or the removed amount of lubricant and/or the fill level or the residual volume and/or time information are stored. Such temporal information may be, for example, the time when the cartridge is placed on the pump.

Figure 2:
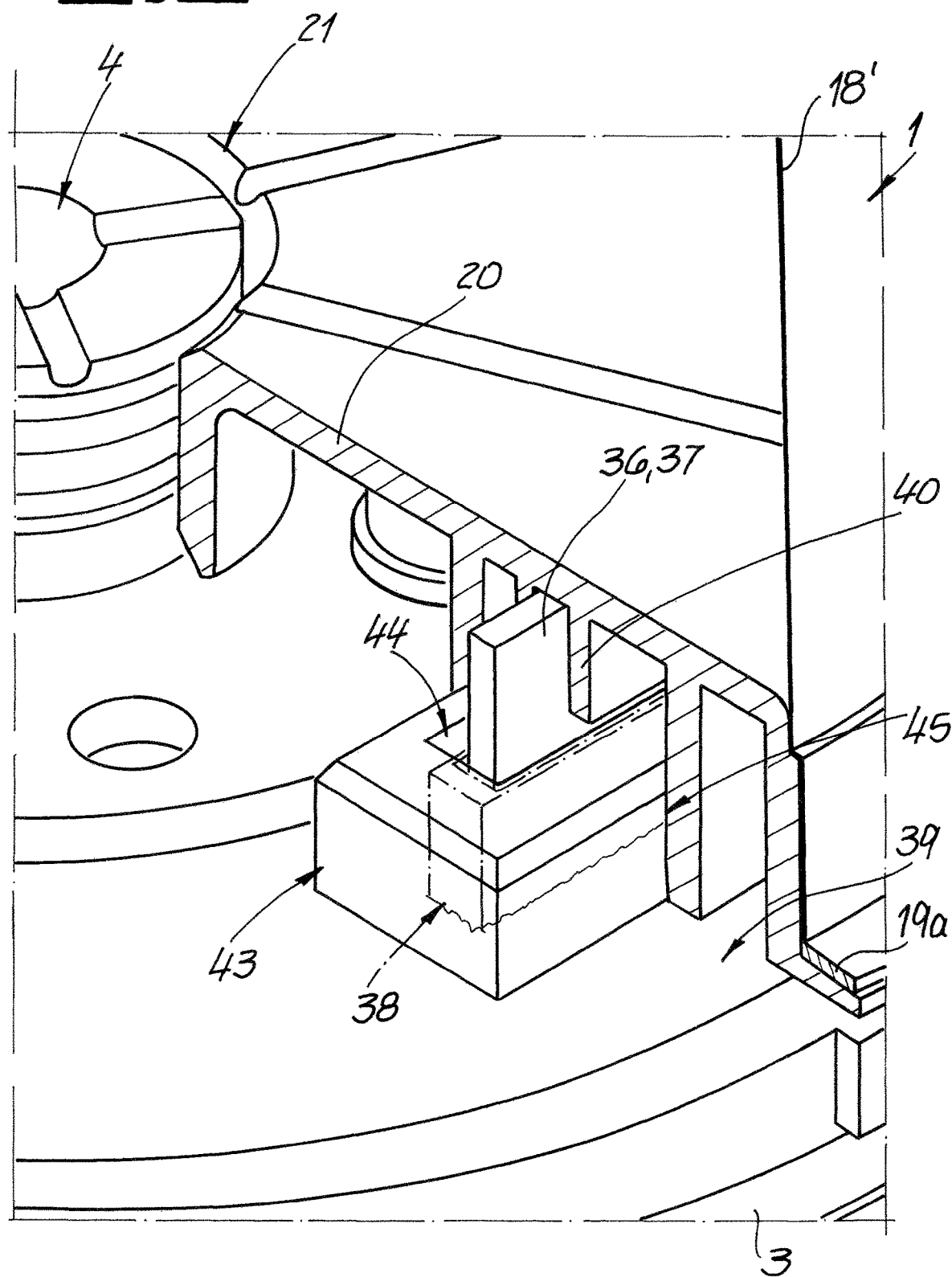
FIG. 2 is an enlarged detail from FIG. 1.

FIGS. 1 and 2 show that a first contact array 37 is on the floor 20 and a second contact array 38 is on the end wall 39, the second contact arrays being mechanically connected to one another while the pump is connected to the reservoir and are thereby electrically contacted. In this case, the first contact array 37 forms the data carrier 36, which in this case is a printed circuit board. The second contact array 38 is electrically connected to the controller 35. This connection is not shown. In the embodiment shown, the first contact array 37, namely the printed circuit board, can be inserted into the second contact array direction 38 and thereby electrically contacted. The second contact array 38 is a circuit board jack or circuit board edge connector into which the printed circuit board is inserted as the first contact array 37. The floor 20 is provided on the outside with a mechanical retainer 40 that mechanically holds the data carrier 36 or the printed circuit board 37 as a first contact array. In the illustrated embodiment, the second contact array 38, which may for example be a circuit board edge plug, is protectively mounted on the end wall 39 within a protective housing or a protective box 43 that sits on the outside of the end wall 39 and is fixedly connected thereto. The protective box 43 has a mouth opening 44 facing the container 1 and through which the printed circuit board 37 or the data carrier 36 can be inserted into the protective box and into the plug therein. FIG. 2 shows the floor 20 provided in the region of the holder 40 with a chamber 45 holding the printed circuit board and into which the box 43 of the pump 2 engages when plugged together.

The reservoir 1 can be, for example, a collapsing container that is emptied by the pump, without separate application of force to the container and, while emptying, automatically collapses. For this purpose, the container 1 can be designed, for example, as a cup-shaped container or collapsible cup 17' that has a thin-walled container side wall 18'. This collapsing cup 17' can in turn be connected to the thin-walled cylindrical container jacket 18' with an outwardly projecting collar 19a with the rigid base component 20, for example via a welded connection or else an adhesive connection. While emptying, this thin-walled cup 17' or its container jacket 18' folds together, so that a waste product with minimal residual volume remains. The reservoir 1 shown in FIG. 1 can be, for example, the one shown in FIGS. 3 and 3A, with a collapsing cup 17'.

FIGS. 4 and 4A show an alternative embodiment of a reservoir 1 with a bellows 17. This bellows 17 has an accordion-like side wall 18 and a circumferential collar 19a with which the bellows 17 is connected to the rigid base component 20. This type of container also collapses while emptying, so that a waste product with minimal residual volume remains.

Figure 5:
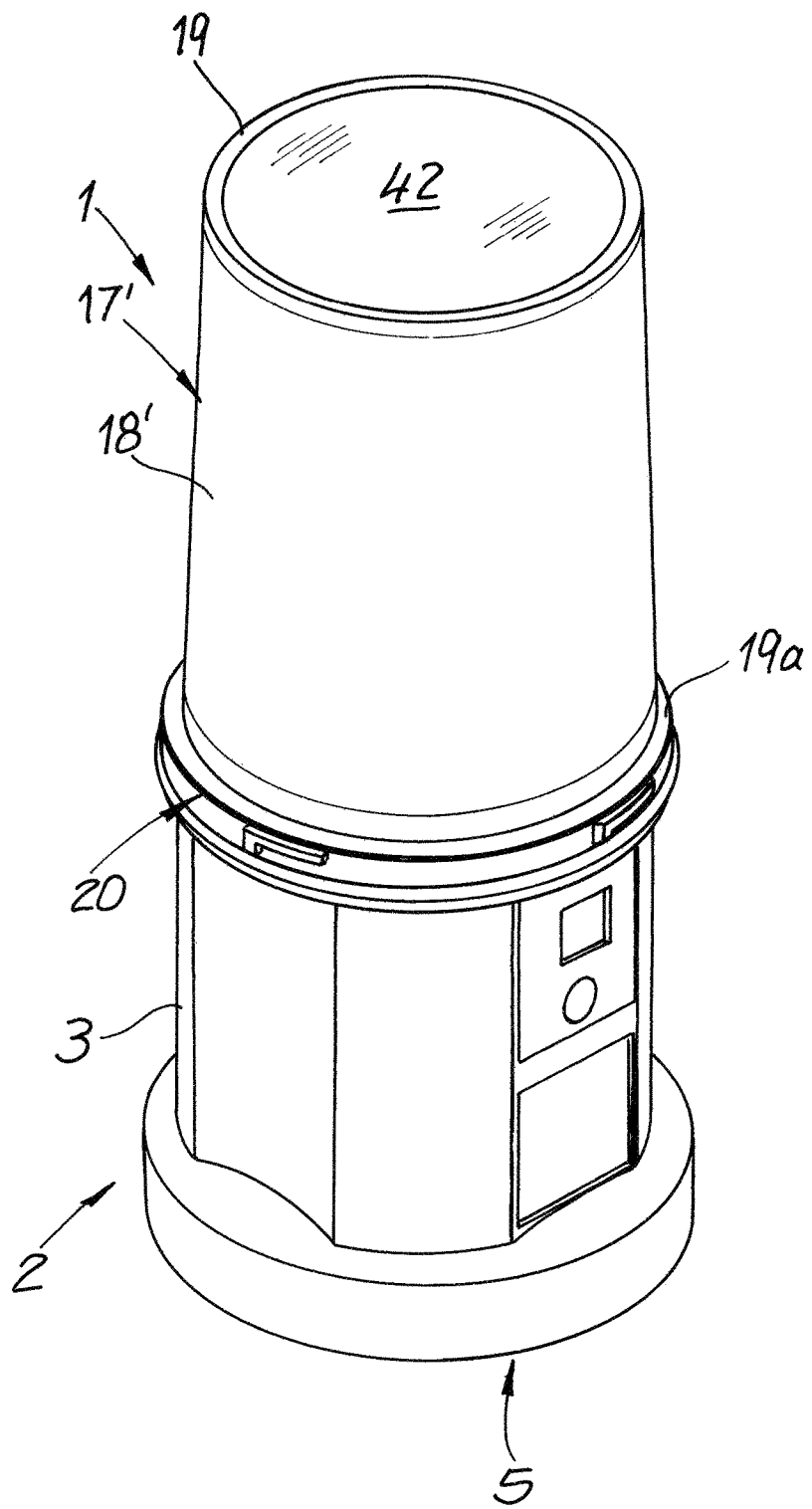
FIG. 5 is an optional variant of the lubricant dispenser of FIG. 1.

Independently of the specific embodiment, the reservoir 1 preferably has an upper end or top wall 19 that, while emptying, lowers, for example, toward the floor 20 and the pump 2. FIG. 5 optionally shows such an embodiment of a lubricant dispenser. By way of example, a collapsible reservoir 1, for example in this embodiment a collapsible inverted cup, is again shown, but in this illustration without an attached protective cap. It can be seen that a detectable label 42 is on the container top wall 19, for example on the outside face thereof and that is for example formed from a metallic and/or a ferromagnetic material. It can be seen in FIG. 1 that, optionally, a sensor 41 can be mounted on the pump for detecting approach of the container cover 19 to the floor 20 in order to detect the empty state, in which the detectable label 42 can be detected by this sensor 41. In this way, fill level can be monitored very simply and reliably. The sensor can be connected to the controller 35, so that it can generate or output information about an empty condition, for example by an optical or acoustic alarm.

The embodiments illustrated in the figures are designed, for example, in such a way that, as it is being mechanically installed, the electronic data carrier 36 is also being connected to the electronic or communication technology at the same time, to be precise in a cable-bound or otherwise hard-wired manner the described plug-in connections. Alternatively, however, the invention also includes those embodiments in that when the reservoir 1 is mechanically connected to the pump 2, a wireless communication connection is established between the data carrier 36 and the controller 35. In this case, for example, a radio link can be accessed, preferably in the radio frequency range. It can be, for example, the standard RFID technology can be used in that the reservoir 1 is equipped with a data carrier 36 in the form of an RFID transponder. The pump 2 or its controllers 35 can be equipped with a corresponding reader or a reader and writer unit for this RFID transponder. Such an embodiment is not shown in the figures.

The invention claimed is:

1. A lubricant dispenser comprising:
   a reservoir filled with lubricant and having a downwardly directly floor end face;
   an outlet port on the floor end face;
   a pump;
   a housing holding the pump and having an upwardly directed housing end face juxtaposable with the floor end face of the reservoir;
   an intake port on the housing end face, the housing being releasably connectable to the reservoir for connection of the intake port to the outlet port with the end faces closely juxtaposed;
   an electric controller on and connected to the pump for, when the housing is connected to the reservoir, conveying lubricant from the outlet port of the reservoir into the intake port of the housing;
   an electronic data carrier on the reservoir and carrying information identifying the reservoir;
   a first contact array connected to the data carrier of the reservoir, carried on the floor end face, and directed toward the housing end face when the reservoir is connected to the pump housing; and
   a second contact array connected to the controller, on the housing end face, and directed toward the reservoir, the first and second arrays being simultaneously mechanically brought together and electrically contacted on mechanical connection of the pump to the reservoir for transfer of the information on the data carrier to the controller.

2. The lubricant dispenser according to claim 1, wherein the first contact array is pluggable into the second contact array and is thereby electrically contacted, or conversely the second contact array is pluggable into the first contact array and is thereby electrically contacted.

3. The lubricant dispenser according to claim 1, wherein the data carrier is integrated into the first contact array or is formed with the first contact array.

4. The lubricant dispenser according to claim 3, wherein the first contact array is an electronic circuit board having or forming the data carrier.

5. The lubricant dispenser according to claim 4, wherein the second contact array is a printed circuit board jack into which is insertable the printed circuit board of the first contact array as the first contact array, the printed circuit board jack being connected to the controller.

6. The lubricant dispenser according to claim 1, wherein the electronic data carrier is connectable wirelessly to the electronic controller and can be read out wirelessly by the controller.

7. The lubricant dispenser according to claim 6, wherein the data carrier has an RFID transponder and the pump or the controller is equipped or connected to an RFID reader.

8. The lubricant dispenser according to claim 1, wherein the data carrier has a memory in which information can be stored.

9. The lubricant dispenser according to claim 1, wherein the floor is provided externally with a mechanical retainer in which the data carrier is held mechanically.

10. The lubricant dispenser according to claim 1, wherein the data carrier is readable by the controller of the pump and information can also be written in the data carrier.

11. The lubricant dispenser according to claim 1, wherein the reservoir is a collapsible container or has a collapsing inner container that is a cylindrical, flexible cup casing or a concertina-like side wall designed as a bellows, the cup casing or container casing being connected to a rigid base component having or forming the floor.

12. The lubricant dispenser according to claim 1, wherein the reservoir has an upper top-side container cover that, on emptying of the collapsing container, is lowered toward the floor and the pump, a sensor being provided in or on the pump to detect an approach of the container top wall to the floor in order to detect an empty state.

13. The lubricant dispenser according to claim 12, further comprising:
   a detectable label on the container cover and detectable by the sensor.

* * * * *